June 23, 1931. E. L. SMALLEY 1,811,159
FURNACE OR HEAT TREATMENT CHAMBER COOLING MEANS
Original Filed Feb. 9, 1928  2 Sheets-Sheet 1
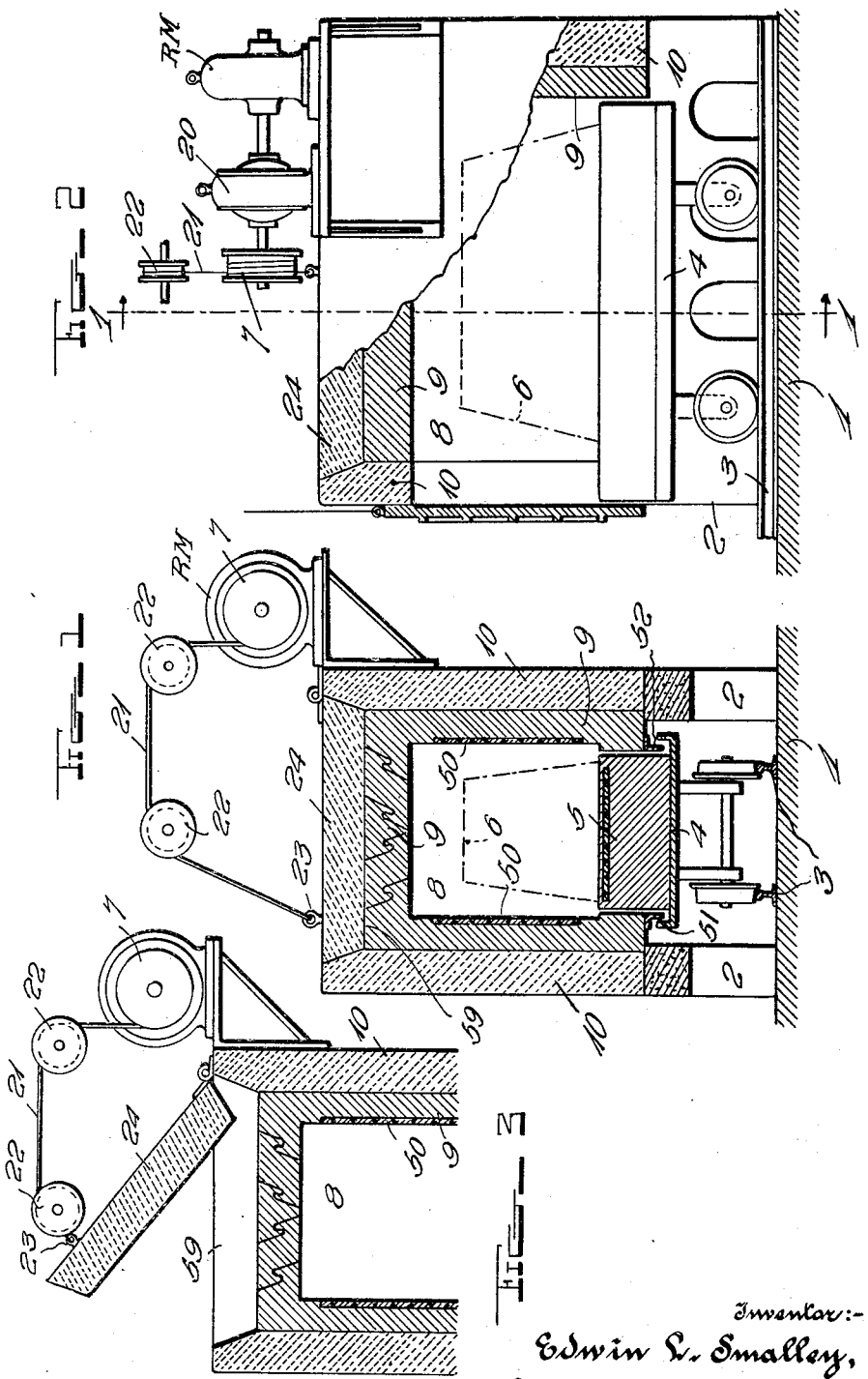
Inventor:-
Edwin L. Smalley,
By John B. Brady
Attorney

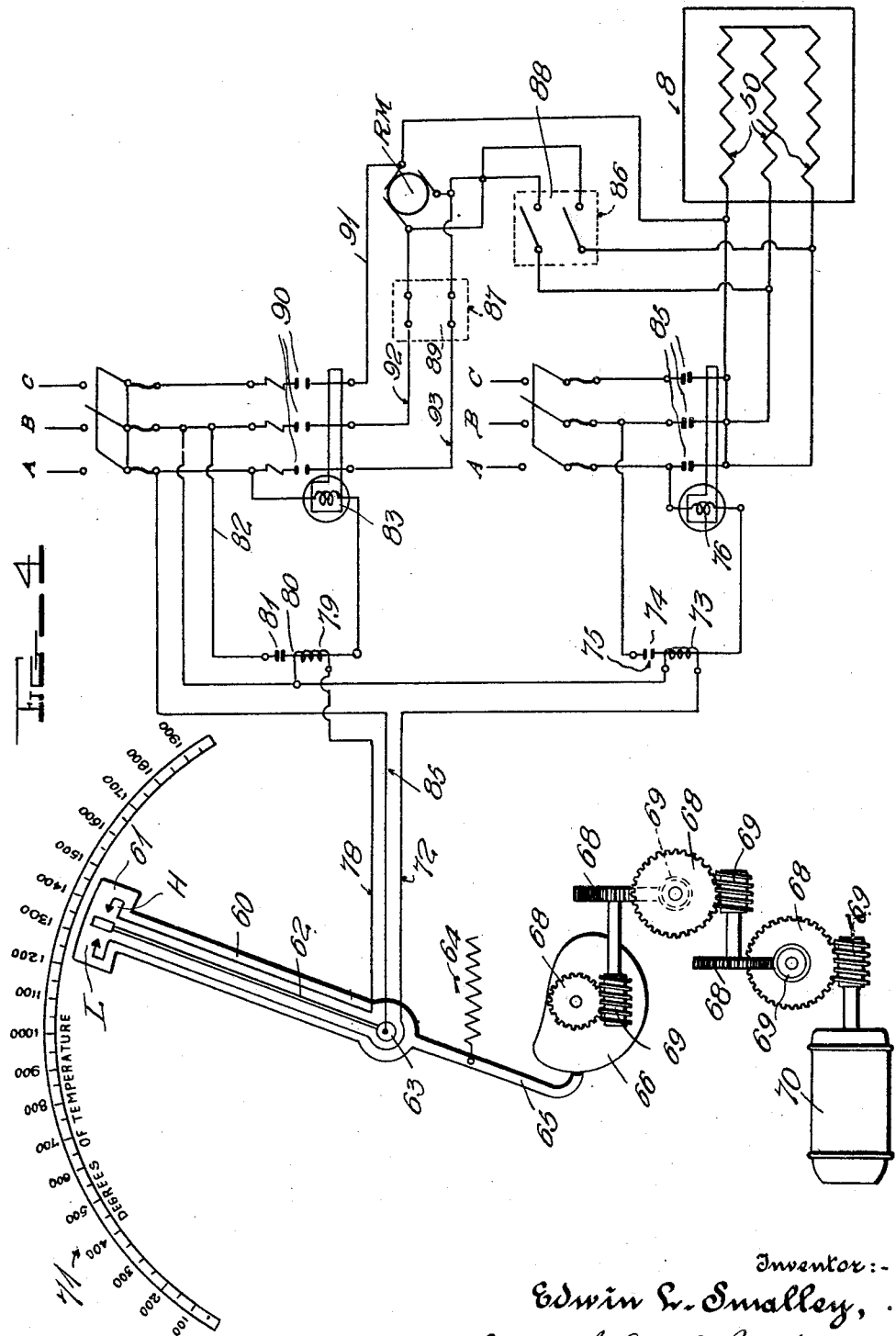

Patented June 23, 1931

1,811,159

UNITED STATES PATENT OFFICE

EDWIN L. SMALLEY, OF WHITEFISH BAY, WISCONSIN, ASSIGNOR TO HEVI DUTY ELECTRIC COMPANY, OF MILWAUKEE, WISCONSIN, A CORPORATION OF WISCONSIN

FURNACE OR HEAT TREATMENT CHAMBER COOLING MEANS

Original application filed February 9, 1928, Serial No. 253,199. Divided and this application filed April 1, 1929. Serial No. 351,680.

My invention relates broadly to furnaces or heat treatment chambers and more particularly to a method of cooling furnaces or heat treatment chambers and the material therein without subjecting the material within the furnace to the oxidizing action of free air.

This application is a division of my application Serial No. 253,199, filed February 9, 1928, for furnace or heat treatment chamber cooling means.

One of the objects of my invention is to provide a construction of cooling system for furnaces or heat treatment chambers by which material deposited within the furnace for cooling may be subjected to a predetermined temperature gradient over a predetermined time period.

Another object of my invention is to provide a method of cooling a charge within a furnace or chamber without the admission of free air to the furnace or chamber, reducing the amount of oxidization which would otherwise be present, with means for controlling the rate of such cooling.

A still further object of my invention is to provide a construction of furnace or cooling chamber wherein the rate of cooling may be controlled by a reduction in the amount of heat insulation around the furnace at predetermined times for controlling the cooling of the charge at a selected rate while preventing the oxidizing action which would result from the contact of free air with the charge within the furnace.

Other and further objects of my invention reside in the arrangement of control apparatus for cooling means in heat treatment furnaces or chambers and the selective operation thereof for effecting the cooling of a charge along a predetermined temperature gradient over a definite time period.

My invention will be more fully understood from the specification hereinafter following by reference to the accompanying drawings in which:

Figure 1 is a cross-sectional view through a furnace and cooling chamber embodying the principles of my invention; Fig. 2 is a side elevation of the furnace shown in Fig. 1 partially broken away and illustrated in cross-section; Fig. 3 is a fragmentary view of the operating structure forming the cooling means for the furnace and heat treatment chamber illustrated in Fig. 1; and Fig. 4 is a schematic wiring diagram showing the arrangement of equipment for controlling the cooling cycle by removal of the insulation from the walls of the furnace as illustrated in Figs. 1, 2 and 3.

My invention is directed to a method of cooling furnaces or heat treatment chambers without the admission of free air to a furnace chamber or to a cooling chamber, either by manual operation or control of the cooling means, or automatically controlled means. By my invention when either a furnace or a cooling chamber is controlled automatically, it may be accomplished at a predetermined time-temperature-cycle. The actual invention consists of providing a cooling means which is mechanically and electrically interlocked with a heating means, whereby the cooling may be either retarded or accelerated either manually or automatically controlled.

In numerous manufacturing processes at the present time, such as in the heat treatment of certain kinds of rolled alloy steels or alloy castings; or in the manufacture of glassware and pottery, or other ceramic processes; or in the manufacture of malleable iron, it is extremely desirable to control the time of heating to a predetermined temperature, holding that temperature until the work is thoroughly saturated and the change of structure in the work effected, and then subsequently to cool at a predetermined rate, or especially to accelerate the cooling without detriment to the work in process, and thus save considerable manufacturing time.

The time of cooling depends on the total absorbed heat in the charge of a furnace or cooling chamber, and the radiation from the furnace walls. In a given furnace, a light weight charge will cool faster than a heavy weight charge, and this provides a means of cooling in a given time at a predetermined rate, regardless of the weight of the charge in the furnace.

Heretofore cooling has been effected by the introduction of free air into the furnace or cooling chamber, but this is highly undesirable, particularly in steel treatment, as it produces excessive oxidization.

Heretofore it has been proposed to subject a selected charge to heat and then permit natural cooling thereof. It requires a considerable time period to effect such natural cooling. In one case heretofore investigated to cool a six ton charge of miscellaneous steel castings by natural dissipation of the heat of the charge through the furnace walls, without admission of free air to the furnace chamber, required thirty-six hours. After the installation of the flues and cooling methods set forth herein, the same weight of charge was cooled without the admission of free air in 22½ hours. The complete cycle consists of starting with the furnace comparatively cool, as at a temperature residue after the previous day's run, bringing the charge up to an annealing temperature of 1600 to 1650° F., holding the furnace and charge until the charge is thoroughly and uniformly saturated at one of those temperatures, and then cooling as rapidly as possible to a temperature below a visible heat, which is about 850° F. Below that temperature, castings may be subjected to free air circulation without excessive oxidization and without setting up strains in the castings that would be inherent if cooled too rapidly.

The necessity for a cooling chamber in combination with a furnace chamber may be shown by the fact that the furnace chamber, having a car in which there are heating elements on the car top in accordance with E. L. Smalley's Patent No. 1,547,623, dated July 28, 1925, for electrical furnaces, can heat a given weight of charge or mass density at the rate of three heats per day compared to furnaces without car top heat requiring 12 hours. In order to effect economic operation of the furnace the cooling period is advanced by the system herein described to render the furnace available to take a new charge within a reasonable time period.

In the drawings, RM represents a reversible motor directly connected to worm gear speed reducer 20, attached to cable drum 7. Cable 21 runs over sheaves 22, where it is attached to cover 8 as by screw eye 23. Motor RM, through mechanism as shown, controlled as in diagram Fig. 4, can raise cover 24 to its uppermost position shown in Fig. 3 from the normal position in pit 59 shown in Figs. 1 and 2, and can then lower it to closed position adjacent the heat insulation covering in successive cycles as required. This arrangement does not permit of free air access to the furnace chamber, but cooling is accelerated by removing the insulation from the arch, causing rapid radiation from the conducted heat through the furnace arch. I do not, however, intend my invention to be limited to a hinged cover above the arch, as I may hinge the panels on the side walls as effectively as above the arch.

Motor RM can be operated manually by the opening and closing of a service switch. Cable drum 7 of Figs. 1, 2 and 3 may be operated manually by using a winch with a crank for hand operation, affording a means of raising the lowering cover 24 of Figs. 1, 2 and 3 at will.

As a means of automatically accomplishing a predetermined rate of heating, soaking and cooling, I show diagrammatically in Fig. 4 a wiring diagram of an electrically operated control system.

In Fig. 4, 60 is a movable arm of a program controller, carrying a contact table 61, with electrical contact L and electrical contact H. 62 is the customary form of pyrometer needle of said program controlled or time-temperature-cycle controller, actuated by thermocouple located in the furnace chamber or in a cooling chamber (couple not shown). This movable pyrometer needle 62 is rotatable about a common center 63, which is concentric with the center about which movable arm 60 is rotatable. 64 is a helical spring in tension, keeping lever arm 65 in constant contact with the perimeter of cam 66. Cam 66 can be made to make any required number of revolutions in any required time, as by means of a train of worm wheels and worms 68 and 69, respectively, driven by means of motor 70.

The contour of cam 66 can be made of any shape that is required to move the contact arm 60 across scale 71, and hold arm 60 at any position on scale 71, and to reverse the movement of arm 60 backward to the starting point, and cause any action in a predetermined time cycle.

The train of worm wheels and worms is drawn to scale. If motor 70 revolves at the rate of 1800 revolutions per minute, cam 66 with the train as shown would revolve .972 revolutions per week, or approximately four per month.

In Fig. 4, lines 78, 85 and 72 are arranged in the controlling circuit. When the temperature in chamber 8, shown heated by electric heating coils 50 is below the required temperature, the thermocouple actuated needle 62 will be deflected until it makes contact with L, thereby setting up a circuit through line 72, through the coils 73 of a relay switch 74, and thereby closing contact 75. Closing of contact 75 energizes coil 76 of main line contactor and closes contacts 85, thereby applying energy to coils 50 of furnace 8. The rising temperature of furnace causes thermocouple (not shown) in furnace to become heated to a higher temperature, and thus needle 62 of the instrument is swayed away from contact L toward contact H, but not in contact with either, and thus opens the circuit through line 72, deenergizing coils 73 and 76, and thereby opening the main contactors 85.

Limit switches 86 and 87 having contacts 88 and 89 are mechanically interlocked, and are opened and closed by the movement of cover 24 in Figs. 1, 2 and 3. When cover 24 is in its closed position as described, contacts 88 are open and contacts 89 are closed. When the cover 24 reaches its upper limit as shown in Fig. 3, the reverse condition exists and contacts 88 are closed and 89 are opened.

When the electrical lines A, B and C attached to coils 50 are closed and cover 24 is closed and contacts 88 are open, no energizing of motor RM exists, and therefore no action of cover 24 results.

When the furnace temperature again lowers, a recurrence of the same cycle of contacts and the same results will be effected. If the temperature of the furnace is such as to cause needle 62 to poise between contacts L and H and simultaneously cam 66 through lever 65 should cause arm 60 and contact table 61 to travel toward needle 62 for the purpose of increasing the temperature in the furnace, needle 62 will make contact with L, thereby setting up a recurrence of the same circuits and results as above described.

When the generation of heat in the furnace, as by coils 50 of furnace 8, is too great, pyrometer needle 62 will be deflected to contact H, thereby setting up a current through line 78 and actuating coil 79 of relay 80 by closing relay contact 81. Line 82 thereby becomes energized and by means of coil 83 of main contactor switches 90 closes the main contactor 90 and energizes motor circuits 91, 92 and 93 of reversible motor RM. Motor RM is mounted as in description of Fig. 2. Motor RM operates to raise cover 24 of Figs. 1, 2 and 3, and when said cover reaches its upper position 24 in Fig. 3 it trips limit switches 86 and 87 opening contacts 89 and closing contacts 88, thereby stopping motor.

When sufficient cooling of the furnace or cooling chamber has been effected by radiation from the thus exposed fire brick wall of furnace needle 62 is deflected to contact L, and thus again energizing coils 73 and 76, and closing contactor 85. Contacts 88 of limit switch 86 have been left closed by the last previous operation, and contacts 89 of limit switch 87 have been left open. Therefore, simultaneously, with the energizing of heating coils 50, lines A, B and C energize motor RM, causing motor to run in opposite direction to its last operation, as polarity of motor connections is changed by the wired connections between limit switches 86 and 87, as shown in diagram, and thereby closes cover 24.

A recurrence of similar conditions repeats the same cycles of operation. If similar control of the cooling cycle in a cooling chamber is to be effected, furnace 8 should be considered as a cooling chamber, but it would have no heating coils 50. Otherwise, the same circuits would apply, provided the thermocouple not shown were considered as installed in the cooling chamber.

While I have shown a preferred embodiment of my invention, modifications may be made. Insulation may be removed from other parts of the furnace than at the top thereof. In Fig. 3, I may provide ports at the top of the chamber which may be automatically opened to permit free escape of heat by the automatic raising of cover 24.

Other and further modifications of my invention may be made and I intend no limitations upon my invention other than are imposed by the scope of the appended claims.

What I claim as new and desire to secure by Letters Patent of the United States is as follows:

1. In a furnace structure, a chamber for material to be subjected to heat treatment, heat insulation normally surrounding said chamber for confining the heat within said chamber and means dependent upon the temperature in the furnace chamber for removing a portion of said heat insulation from said chamber during a predetermined time interval for lowering the temperature of the material positioned within said chamber over a predetermined time interval without admission of free air to said chamber and means for restoring said heat insulation to its original position when said chamber returns to a predetermined temperature.

2. In a heat treatment apparatus, a chamber for material to be subjected to heat treatment, a heat insulation covering for said chamber, and means dependent upon the temperature in said chamber for removing a portion of said heat insulation covering over a predetermined time period for lowering the temperature of the material within said chamber without admission of free air to said chamber and means for restoring said heat insulation to its original position when the temperature of said chamber returns to a predetermined value.

3. In a heat treatment apparatus, a chamber for material to be subjected to heat treatment, a heat resisting covering for said chamber, means for eliminating the heat resisting effect of said covering over predetermined time intervals for facilitating the cooling of the material within said chamber over a predetermined time period without admission of free air to said chamber and means for restoring the heat resisting effect of said covering when said chamber cools to a predetermined temperature.

4. In a heat treatment apparatus, a chamber for material to be subjected to heat treatment, a heat resisting covering surrounding said chamber, a portion of said covering being removable to reduce the effect of the heat insulation and to facilitate cooling of the material within said chamber at a predetermined rate without admission of free air to said chamber, said means being controllable for operation over a predetermined time-temperature-cycle for subjecting the material within said chamber to variable heat effects and means for automatically removing said heat insulation from said chamber and restoring said heat insulation to said chamber according to the temperature conditions within said chamber.

5. In a furnace structure, a chamber for material to be subjected to heat treatment, heat insulation normally surrounding said chamber for confining the heat within said chamber, automatically operating means for removing a portion of said heat insulation from said chamber during a predetermined time interval for lowering the temperature of the material positioned within said chamber over a predetermined time interval without admission of free air to said chamber and automatically operative means for restoring said heat insulation to said chamber when the temperature thereof returns to a predetermined value.

6. In a heat treatment apparatus, a chamber for material to be subjected to heat treatment, electrical means for heating said chamber, a heat insulation covering for said chamber, and automatically actuated means for deenergizing said electrical means and removing a portion of said heat insulation covering over a predetermined time period for lowering the temperature of the material within said chamber without admission of free air to said chamber and means for restoring said heat insulation to normal position when the temperature of said chamber reaches a predetermined value.

7. In a heat treatment apparatus, a chamber for material to be subjected to heat treatment, electrical means for heating said chamber, a heat resisting covering for said chamber and automatically actuated means for deenergizing said electrical means while eliminating the heat resisting effect of said covering over predetermined time intervals for facilitating the cooling of the material within said chamber over a predetermined time period without admission of free air to said chamber, said means operating to restore the heat resisting effect of said covering when said chamber is restored to a predetermined temperature.

8. In a heat treatment apparatus, a chamber for material to be subjected to heat treatment, a heat resisting covering surrounding said chamber, a portion of said covering being removable to reduce the effect of the heat insulation and to facilitate cooling of the material within said chamber at a predetermined rate, without admission of free air to said chamber, said means being controllable for operation over a predetermined time-temperature-cycle for subjecting the material within said chamber to variable heat effects, and means controlled by the temperature in said chamber for automatically withdrawing the portion of said covering which is removable and restoring the said portion of said covering to said chamber when the temperature within said chamber is restored to normal value.

In testimony whereof I affix my signature.

EDWIN L. SMALLEY.